United States Patent [19]
Agrawal et al.

[11] Patent Number: 5,724,573
[45] Date of Patent: Mar. 3, 1998

[54] METHOD AND SYSTEM FOR MINING QUANTITATIVE ASSOCIATION RULES IN LARGE RELATIONAL TABLES

[75] Inventors: Rakesh Agrawal; Ramakrishnan Srikant, both of San Jose, Calif.

[73] Assignee: International Business Machines Corporation, Armonk, N.Y.

[21] Appl. No.: 577,945

[22] Filed: Dec. 22, 1995

[51] Int. Cl.$^6$ .................................................... G06F 17/30
[52] U.S. Cl. .......................... 395/606; 395/601; 395/603
[58] Field of Search .................................. 395/601, 603, 395/606

[56] References Cited

U.S. PATENT DOCUMENTS

| | | | |
|---|---|---|---|
| 5,253,361 | 10/1993 | Thurman et al. | 395/603 |
| 5,315,709 | 5/1994 | Alston, Jr. et al. | 395/606 |
| 5,504,890 | 4/1996 | Sanford | 395/603 |
| 5,537,586 | 7/1996 | Amram et al. | 395/603 |
| 5,614,341 | 3/1997 | Agrawal et al. | 395/210 |

OTHER PUBLICATIONS

DeWitt et al, "The Gamma Database Machine Project", IEEE Trans. Knowledge & Data Engineering, Mar., 31, 1990.

Mannila et al, "Improved Methods for Finding Association Rules", Pub. No. c–1993–65, Universith Helsinki, 193, Dec. 31, 1993.

Park et al, "Eficient Data Mining for Association Rules", IBM Research Report, R210156, Aug. 31, 1995.

R. Agrawal, T. Imielinski, A Swami, Mining Association Rules Between Sets of Items in Large Databases, In Proc. of the ACM SIGMOD Conference on Management of Data, pp. 207–216, Washington, D.C. May 1993.

R. Agrawal, R. Srikant, Fast Algorithms for Mining Association Rules, In Proc. of the VLDB Conference, Santiago, Chile, pp. 487–499, Sep. 1944.

N. Beckmann, H. Kriegel, R. Schneider, B. Seeger, The R*–tree: An Efficient and Robust Access Method for Points and Rectangles, In Proc. of ACM SIGMOD, pp. 322–331, Atlantic City, NJ, May 1990.

R. T. NG, J. Han, Efficient and Effective Clustering Methods for Spatial Data Mining, In Proc. of the VLDB Conference, Santiago, Chile, pp. 144–155, Sep. 1994.

J. S. Park, M. Chen, P. S. Yu, An Effective Hash–Based Algorithm for Mining Association Rules, In Proc. of the ACM–SIGMOD Conference on Management of Data, pp. 175–186 San Jose, California May 1995.

G. P. Shapiro, Discovery, Analysis, and Presentation of Strong Rules, Knowledge Discovery in Databases, pp. 229–248, AAAI/MIT Press, Menlo Park, CA, 1991 (GTE Lab. Incorporated).

(List continued on next page.)

*Primary Examiner*—Wayne Amsbury
*Attorney, Agent, or Firm*—Khanh Q. Tran; James C. Pintner

[57] ABSTRACT

A method and apparatus are disclosed for mining quantitative association rules from a relational table of records. The method comprises the steps of: partitioning the values of selected quantitative attributes into intervals, combining adjacent attribute values and intervals into ranges, generating candidate itemsets, determining frequent itemsets, and outputting an association rule when the support for a frequent itemset bears a predetermined relationship to the support for a subset of the frequent itemset. Preferably, the partitioning step includes determining whether to partition and the number of partitions based on a partial incompleteness measure. The candidate generation includes discarding those itemsets not meeting a user-specified interest level and those having a subset which is not a frequent itemset. The frequent itemsets are determined using super-candidates that include information of the candidate itemsets. Preferably, each super-candidate has a data structure, such as a multi-dimensional tree or array, representing quantitative attributes common to the replaced candidate itemsets.

30 Claims, 9 Drawing Sheets

OTHER PUBLICATIONS

M. Houtsma, A. Swami, Set-Oriented Mining for Association Rules, IBM Research Report 9567 (83573), Computer Science, Oct. 22, 1993.

R. Srikant, R. Agrawal, Mining Generalized Association Rules, In Proc. of the VLDB Conference, pp. 407–419, Zurich, Switzerland, Sep. 1995.

J. Han, Y. Fu, Discovery of Multiple-Level Association Rules from Large Databases, In Proc. of the VLDB Conference, pp. 420–431, Zurich Switzerland, Sep. 1995.

A. Savasere, E. Omiecinski, S. Navathe, An Efficient Algorithm for Mining Association Rules in Large Databases, Proceedings of the 21st VLDB Conference pp. 432–444, Zurich, Switzerland, Sep. 1995.

| RecordID | Age | Married | NumCars |
|---|---|---|---|
| 100 | 23 | No | 1 |
| 200 | 25 | Yes | 1 |
| 300 | 29 | No | 0 |
| 400 | 34 | Yes | 2 |
| 500 | 38 | Yes | 2 |

FIG. 1    Table of Records

| Rules (Sample) | Support | Confidence |
|---|---|---|
| ⟨Age: 30..39⟩ and ⟨Married: Yes⟩ ⇒ ⟨NumCars: 2..2⟩ | 40% | 100% |
| ⟨NumCars: 0..1⟩ ⇒ ⟨Married: No⟩ | 40% | 66.6% |

(minimum support = 40%, minimum confidence = 50%)

FIG. 2

| RecordID | Age: 20..29 | Age: 30..39 | Married: Yes | Married: No | Cars: 0 | Cars: 1 | Cars: 2 |
|---|---|---|---|---|---|---|---|
| 100 | 1 | 0 | 0 | 1 | 0 | 1 | 0 |
| 200 | 1 | 0 | 1 | 0 | 0 | 1 | 0 |
| 300 | 1 | 0 | 0 | 1 | 1 | 0 | 0 |
| 400 | 0 | 1 | 1 | 0 | 0 | 0 | 1 |
| 500 | 0 | 1 | 1 | 0 | 0 | 0 | 1 |

FIG. 3    Typical Mapping 5,724,573

1

METHOD AND SYSTEM FOR MINING QUANTITATIVE ASSOCIATION RULES IN LARGE RELATIONAL TABLES

FIELD OF THE INVENTION

The present invention generally relates to data processing. In particular, the invention relates to methods and apparatus for mining quantitative association rules in large relational tables.

BACKGROUND OF THE INVENTION

Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a particular time period after the first purchase.

Identifying association rules from a large database of transactions is an essential part of data mining. An association rule is an expression of the form X→Y, where X and Y are sets of items. In the retail domain, the data to be mined typically consist of transactions, where each transaction is characterized by a set of items. For example, the database may contain customers' sale transactions on shoes and jackets. A possible association rule may be of the form "30 percent of transactions that contain jackets also contain shoes; 10 percent of all transactions contain both shoes and jackets". The 30 percent value is referred to as the confidence of the rule, while the 10 percent value is the support of the rule. The task of mining association rules involves finding all the association rules from the transactions that satisfy certain user-specified minimum support and confidence constraints.

Conceptually, the problem may be viewed as finding the association rules from a relational table of records. Each record may represent a transaction, as in the case of a retail transaction database, or other data items in the database. Each record has one or more attributes where each attribute corresponds to an item of the transaction. In cases where the attributes have simple values, such as those in the example, the problem may be further simplified by assigning Boolean values to the attribute values to indicate whether a particular attribute value is present in a record. For example, a "Marital Status" attribute would have a "1" value if the person is married and a "0" value if the person is single. This technique, however, does not work well in most scientific and business applications where the attributes commonly bear more complex values and would be difficult to be mapped into Boolean values.

As an example, consider the relational table of FIG. 1, which was derived from a database of automobile ownership information. The relational table has many records, one for each car owner. Each record has three attributes: "Age" for the owner's age, "Married" for the owner's marital status, and "NumCars" for the number of cars owned by that person. The "Age" and "NumCars" attributes are referred to as quantitative attributes because they may have any integer

2 as their values. The "Married" attribute is a categorical attribute because its values are of categorical types, here, "Yes" or "No". A desired quantitative association rule will typically be of the form: "<Age:30 through 39> and <Married: Yes>→<NumCars: 2>", as shown in FIG. 2.

Generally, prior art methods for mining association rules were aimed at extracting Boolean association rules, i.e., where an attribute of the record only indicates whether a particular item is present in the database. As a result, these methods are not suitable for transactions that include complex attributes as in the case of the example. Such rich attributes are typical in many applications, and may be of quantitative type such as "age" and "income", or categorical type such as "zip code" and "make of car".

In the co-pending U.S. patent application Ser. No. 08/415,006 for "System and Method for Quickly Mining Association Rules In A Database", now pending, (hereinafter "006 application"), an effective method is disclosed for mining association rules that indicate consumer purchasing tendencies from transaction itemsets, based on a user-defined confidence level. The method generates the desired rules by identifying which frequently recurring itemsets are likely to be purchased along with other frequently recurring itemsets in a transaction. The itemsets contain information as to whether a particular item is or is not present in the transaction, i.e., equivalent to Boolean values "1" and "0", respectively, for the associated attribute. Attributes with a large number of values, as in the case of quantitative attributes, are not specifically addressed by the method of the '006 application.

In another co-pending application, U.S. patent Ser. No. 08/436,794 for "System and Method for Mining Generalized Association Rules In Databases", now U.S. Pat. No. 5,615,341 (hereinafter '794 application), a different method is disclosed for mining association rules from consumer transaction itemsets that contain items characterized by a hierarchical taxonomy. The rules generated by the method potentially cover several levels of the taxonomy. Like the '006 application, the '794 application addresses itemsets whose items are either present or not present in the database. Complex attribute values such as the number of items bought, amount paid for, salary level, or type of merchandise were not specifically considered in '794 application.

Conceivably, it is possible to extend the methods disclosed in the referenced applications to handle quantitative and categorical attributes, for example, by mapping each <attribute, value> pair into a Boolean attribute. FIG. 3 illustrates a typical mapping for the automobile example above. The mapping approach, however, becomes impracticable when each attribute has a large number of values which result in an excessive number of Boolean attributes. A second approach involves first partitioning the quantitative attribute values into several intervals and then mapping each <attribute, interval> pair into a Boolean attribute, thus reducing the number of Boolean attributes. The methods for mining Boolean association rules, like those disclosed in the '006 and '794 applications, then can be used to find the association rules based on the Boolean attributes.

Such an approach, however, has two major disadvantages. In a typical case, the number of intervals for an attribute is usually large, which leads to a low support for any single interval of the attribute. As a result, some rules involving this attribute may not be found at all because they lack the required minimum support. This problem is referred to as "MinSup", for minimum support, which is also present in the first approach when the number of attribute values is large.

A second problem, referred to as "MinConf" for minimum confidence, concerns the loss of information due to the grouping of the attribute values. Some rules will have the minimum confidence only when an item in the antecedent part of the rule consists of a single value. The amount of lost information may be reduced by making the interval sizes smaller. However, decreasing the interval sizes in turn makes the "MinSup" problem worse because it increases the number of the intervals. Thus, the solutions to the "MinSup" and "MinConf" problems are inherently contradictory.

A third approach involves considering all possible continuous ranges over the values of each quantitative attribute, or over its partitioned intervals. The "MinSup" problem now disappears since the adjacent intervals or values can be combined to avoid missing rules. Although the "MinConf" problem still remains, the information loss may be reduced by increasing the number of intervals, without encountering the "MinSup" problem. This approach, unfortunately, leads to excessive execution time due to the resulting large number of items per transaction, which is in the order of $n^2$ where n is the number of values or intervals for an attribute.

Another problem with the third approach is that it generally generates a large number of rules because the values of the attributes are now combined into intervals. Some of these rules are not of great value since they are similar to other rules. These rules are commonly referred to as being non-interesting. Increasing the number of intervals to achieve more precise rules, however, would lead to longer execution time. Thus, the third approach also has drawbacks that can not be completely eliminated.

In the paper "*Discovery, Analysis, and Presentation of Strong Rules*", Knowledge Discovery in Databases, AAAI/ MIT Press, pp. 229–248, G. Piatetsky-Shapiro described a method for mining association rules of the form $(x=q_x) \rightarrow (y=q_y)$. However, the Piatetsky-Shapiro method has the disadvantage that the antecedent and consequent parts of the rule are limited to single <attribute, value> pairs. Also, it failed to address the MinSup and MinConf problems described above.

Therefore, there remains a need for an efficient method for mining quantitative association rules from a relational table of records which are characterized by one or more quantitative or categorical attributes, without the above disadvantages of the prior art.

SUMMARY OF THE INVENTION

It is an object of the present invention to provide a method for mining quantitative association rules from a table of records where each record has one or more quantitative or categorical attributes.

Another object of the present invention is to provide a data mining method without the described "MinSup" and "MinConf" problems and having a relatively short execution time.

Still another object of the present invention is a method for mining quantitative association rules that results in a minimum number of non-interesting rules.

The present invention achieves the foregoing and other objects by providing a method for mining quantitative association rules having the following steps. First, for each attribute from a selected subset of the quantitative attributes, the method partitions its values into a number of intervals. The method then determines the support for each interval or value of the attributes. Next, adjacent values for each quantitative attribute, or adjacent intervals if the attribute is partitioned, are combined into ranges, as long as the support for each range is less than a user-specified maximum support.

The method then identifies, from the records, items with at least a minimum support. An item consists of a quantitative attribute and a range, or a categorical attribute and a value. The items with at least the minimum support forming a seed set from which candidate itemsets are to be generated. The method next determines frequent itemsets from the candidate itemsets and uses the new frequent itemsets as the next seed set. Frequent itemsets are those having at least the minimum support. The candidate generation and frequent itemset determination steps are repeated until all the frequent itemsets are found. The method then outputs an association rule whenever the ratio of the support for a selected frequent itemset and the support for a subset of the selected frequent itemset satisfies a user-specified confidence constraint.

Preferably, the step of partitioning the quantitative attributes includes determining, for each quantitative attribute, whether to partition the attribute based on a measure of partial completeness, as defined below. This measure provides an indication of the potential loss of information due to the partitioning. If the attribute is to be partitioned, then the method further determines the number of partitions, also based on the partial completeness measure, and partitions the values of the quantitative attribute accordingly.

In a preferred embodiment of the invention, the generation of candidate itemsets includes joining the itemsets of the seed set to generate a next set of candidate itemsets and discarding any candidate itemset having a subset that is not a frequent itemset. Furthermore, the method may also discard any candidate itemset whose support is more than 1/R, where R is a user-specified interest measure. The support of an itemset is the number of records in the table whose items appear in the itemset.

In another preferred embodiment, the values for each categorical attribute are mapped into a set of consecutive integers to simplify the determination of frequent itemsets. Similarly, the intervals for each partitioned quantitative attribute (or the values for each non-partitioned quantitative attribute) are also mapped into consecutive integers such that the order of the intervals (or values) is preserved.

To minimize the number of non-interesting rules described above, the method further discards those rules that do not satisfy a user-specified interest measure.

Preferably, the step of determining frequent itemsets is performed based on super-candidates which contain information in the candidate itemsets. First, the candidate itemsets are divided into groups, where each group includes the candidate itemsets that have common attributes and common values for the common categorical attributes. Each group is then replaced with a super-candidate which includes the common categorical attributes, their respective values, and a data structure representing the common quantitative attributes.

Next, for each record, the method determines which super-candidates are supported by the categorical attributes of the record. The data structure for each determined super-candidate is updated using the values of the quantitative attributes of the record. Finally, the support for each candidate itemset is determined using the data structures of the super-candidates. To facilitate the search for desired super-candidates, a hash-tree data structure may also be used for organizing the super-candidates.

In one preferred embodiment of the invention, the data structure of each super-candidate is multi-dimensional tree, such as an R*-tree, which contains hyper-rectangles corresponding respectively to the candidate itemsets. Description of the R*-tree may be found in *"The R*-tree: An Efficient and Robust Access Method for Points and Rectangles,"* Proc. of ACM, SIGMOD, pp. 322–331, May 1990. The boundaries of a hyper-rectangle in the n-th dimension correspond to the ranges of the n-th quantitative attribute of the candidate itemset. The values of the quantitative attributes in a record thus correspond to an n-dimensional point in the data space described by the R*tree. Furthermore, in determining the frequent itemsets, a support count for each hyper-rectangle that contains the n-dimensional point is incremented as part of updating the data structure.

In another preferred embodiment, the data structure is an n-dimensional array consisting of cells, where n is the number of common quantitative attributes of the associated super-candidate. Each dimension of the array corresponds to a common quantitative attribute. The number of cells in a j-th dimension of the array is equal to the number of partitions, if the values of the corresponding attribute are partitioned, or the number of values of the attribute, if the values are not partitioned. In addition, the support count for the cell corresponding to the n-dimensional point is incremented as part of updating the data structure. Accordingly, the support count for each candidate itemset is determined by combining the support counts for all the cells within the hyper-rectangle corresponding to the quantitative attributes of the candidate itemset.

In a different aspect of the invention, a computer program product for use with a computer is disclosed for mining quantitative association rules from a table of records. The product includes a recording medium, means recorded on the recording medium, readable or usable by the computer, for instructing the computer to perform the method steps described above.

In yet another aspect of the present invention, a computer-based system is disclosed for mining quantitative association rules from a table of records. The system includes means for partitioning the values of selected quantitative attributes into intervals, means for determining the support for each attribute value or interval, and means for combining adjacent values and intervals into ranges. In addition, the system includes means for identifying items with minimum support, means for generating candidate itemsets from the seed set, means for determining frequent itemsets, means for repeating the operation of selected means, and means for outputting a quantitative association when a confidence constraint is met.

Preferably, the partitioning means includes means for determining whether to partition the values of each quantitative attribute based on a measure of partial completeness, means for determining the number of partitions, and means for partitioning the values. The means for generating candidate itemsets preferably includes means for joining itemsets to generate the next candidates, means for discarding candidate itemsets having a subset that is not a frequent itemset, and means for discarding candidates that do not satisfy an interest measure.

In a preferred embodiment of the invention, the system further has means for mapping the attribute values and intervals into consecutive integers to facilitate the determination of frequent itemsets, and means for pruning those rules that do not meet an interest measure. The means for determining frequent itemsets preferably also includes means for grouping candidate itemsets that have common attributes and categorical attribute values, and means for replacing each group with a super-candidate.

In addition, the means for determining frequent itemsets preferably includes means for determining the super-candidates supported by the categorical attributes of each record, means for updating the super-candidate data structure, and means for entering the super-candidates into a hash-tree. In one preferred embodiment, the data structure of each super-candidate is a multi-dimensional tree, while in another preferred embodiment, the data structure is an n-dimensional array.

Additional objects and advantages of the present invention will be set forth in the description which follows, and in part will be obvious from the description or may be learned from the practice of this invention. The objects of the invention as described herein may be realized and obtained by means particularly pointed out and distinctly claimed in the appended claims taken in conjunction with the accompanying drawings and detailed specification.

BRIEF DESCRIPTION OF THE DRAWINGS

FIG. 1 illustrates an example of a table of records having three attributes.

FIG. 2 illustrates two typical quantitative association rules generated by the method of the invention.

FIG. 3 illustrates an example for mapping each <attribute, value> pair into a Boolean attribute, for use with a prior art Boolean association rule mining method.

DESCRIPTION OF THE PREFERRED EMBODIMENTS

The invention will be primarily described in terms of a method for mining quantitative association rules. However, persons skilled in the art will recognize that a computing system, which includes suitable programming means for operating in accordance with the method to be disclosed, also falls within the spirit and scope of the invention. In addition, the invention may also be embodied in a computer program product, for instance, a recording medium such as a diskette, for use with a suitable data processing system. Programming means may be provided for directing the data processing system to execute the steps of the method of the invention. Such programming means is typically written on the recording medium in a form accessible by the data processing system, such as program code or instructions.

Figure 4:
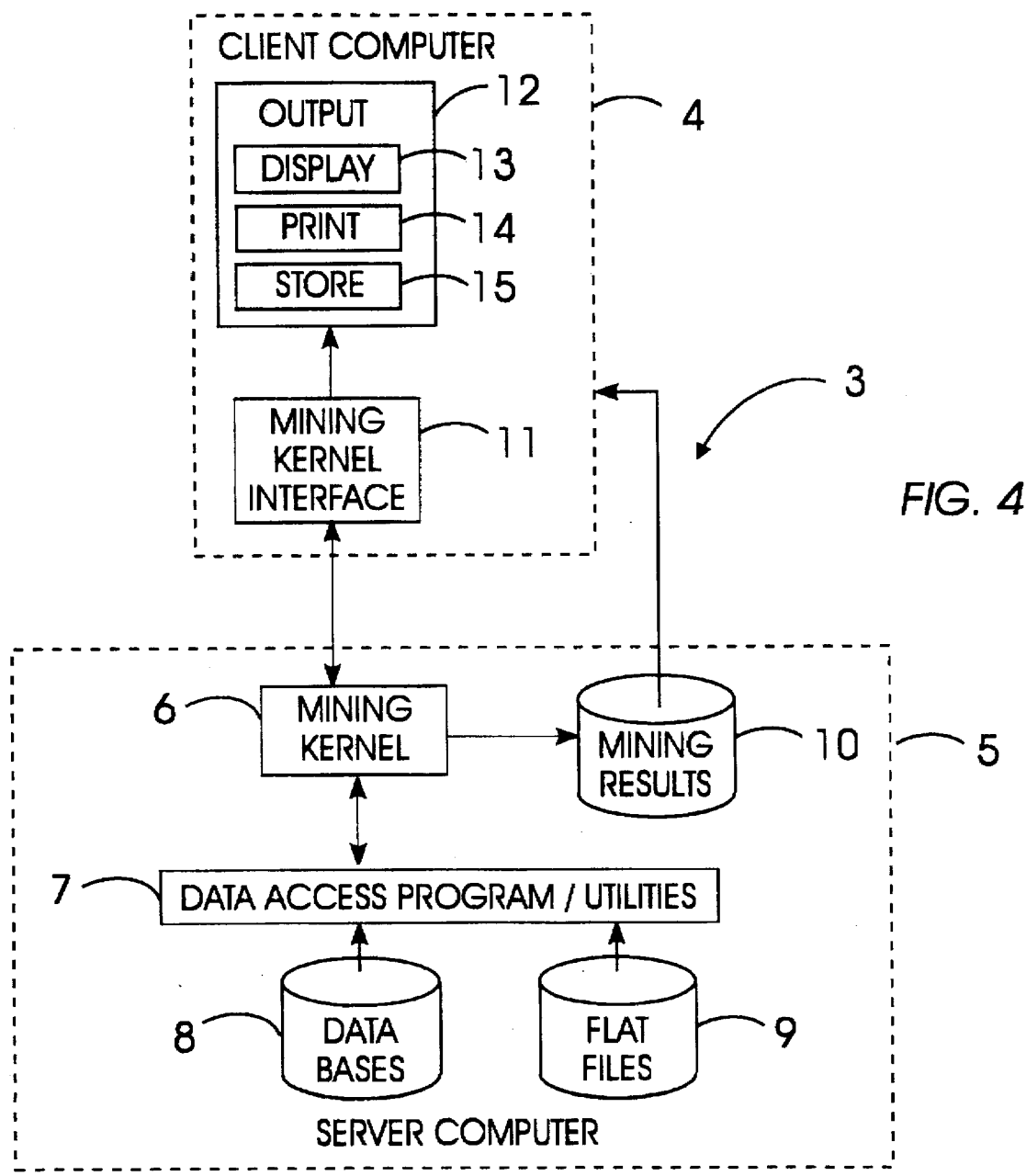
FIG. 4 is a simplified block diagram of a typical computer system for mining quantitative association rules, according to the present invention.

FIG. 4 is a simplified block diagram of a typical computing system 3 with which the method of the invention may be practiced. In FIG. 4, the system 3 includes one or more data processing apparatus, such as a client computer 4 and a server computer 5. In one intended embodiment, the server computer 5 may be a mainframe computer made by IBM Corp., and use an operating system such as one marketed by IBM Corp. under the name MVS. Alternatively, the server computer 5 may be an IBM RS/6000 workstation running version 3.2.5 of the IBM AIX operating system. The server computer 5 may have a database system such as IBM's DB2 product, or it may have data stored as data files, i.e., flat files, in a data storage medium such as a diskette, disk, or tape. It is to be understood that architectures other than the one shown may be used. For example, the functions of the client computer 4 may be incorporated into the server computer 5, and vice versa.

As shown, the operating system of the server computer 5 includes a mining kernel 6 which may be executed by a processor within the server computer 5 as a series of computer-executable instructions. These instructions may reside, for example, in the RAM of the server computer 5. Alternatively, the instructions may be contained on a data storage device with a computer readable medium, such as a computer diskette, a DASD array, magnetic tape, optical storage device, or other suitable data storage devices. As an illustrative embodiment, the instructions may be implemented using the C++ computer programming language.

FIG. 4 shows that, through appropriate data access programs and utilities 7, the mining kernel 6 accesses one or more databases 8 or flat files 9 which contain data transactions. After executing the steps described below, the mining kernel 6 outputs a rule to a result depository 10, which can be accessed by the client computer 4.

Additionally, FIG. 4 shows that the client computer 4 may include a mining kernel interface 11 which, like the mining kernel 6, may be implemented in suitable computer code. Among other tasks, the interface 11 functions as an input mechanism for establishing certain variables such as a rule interest measure which is described below. Further, the client computer 4 preferably includes an output device 12 for outputting or displaying the resulting rules. As shown, the output device 12 may include a display unit 13, a printing device 14, or a data storage medium 15.

Figure 5:
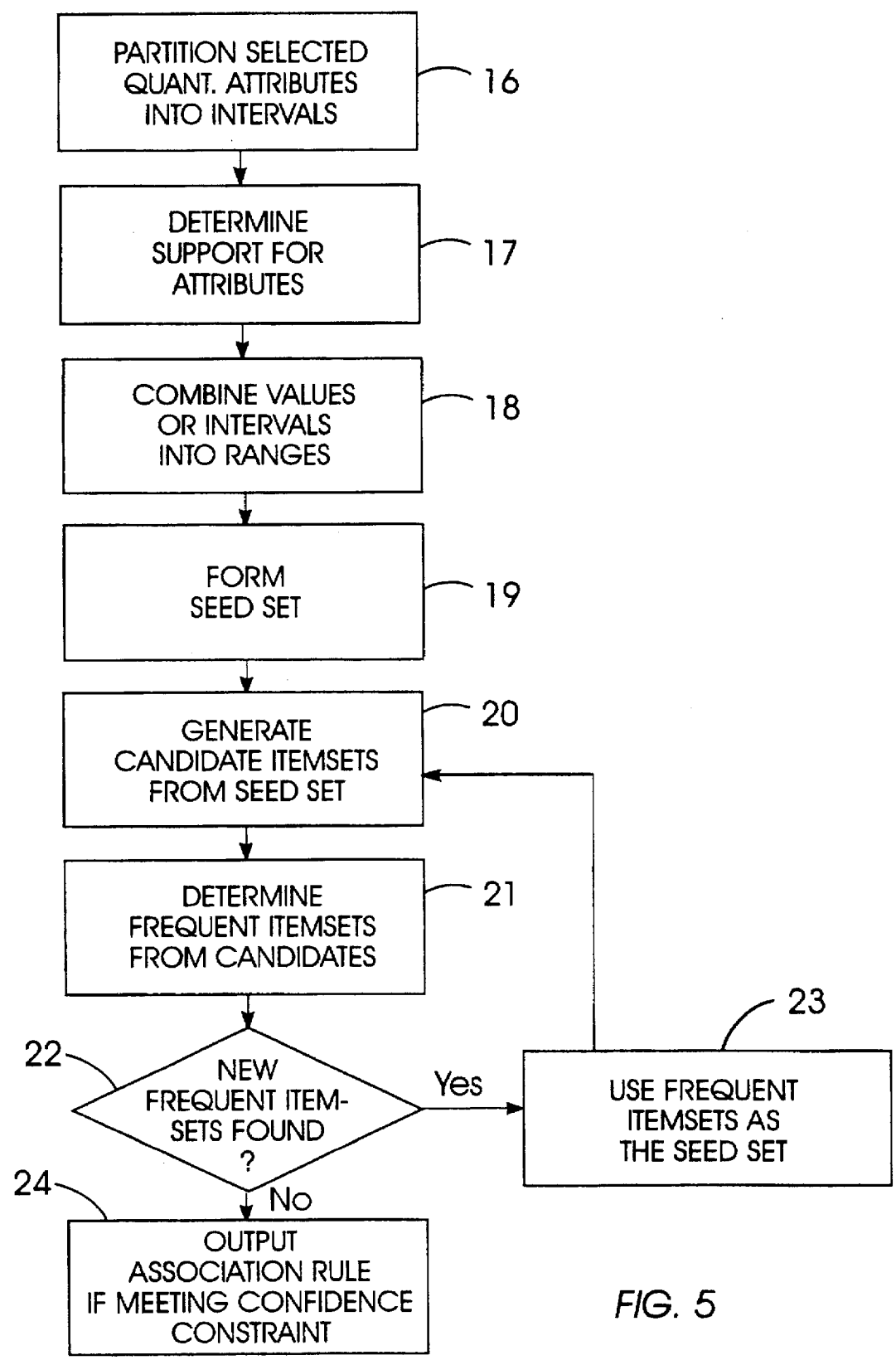
FIG. 5 is a flow chart showing the overall operation of the method of the present invention.

FIG. 5 illustrates the flow chart for the operation of the method for mining quantitative association rules from a table of records. Each record has the values for one or more record attributes. An attribute may be categorical such as "Married" and "Exempt", or quantitative such as "Age" and "Income". Beginning with block 16, the method first partitions the values for each selected quantitative attribute into intervals. Preferred embodiments of block 16 will be described in more detail below.

At block 17, the method determines the support for each value of the categorical attributes and non-partitioned quantitative attributes, and the support for each interval of the partitioned quantitative attributes. The support for an attribute value is the number of records in the table whose attribute values include the value, and the support for an interval is the number of records whose attribute values are part of the interval.

Next, at block 18, adjacent values of each non-partitioned quantitative attribute are combined into ranges of values as long as the support for each range is less than a maximum support. Similarly, adjacent intervals for each partitioned quantitative attribute are also combined into ranges, while satisfying the support requirement. At block 19, the items having at least the minimum support are identified, which together form a seed set. An item is a pair of a quantitative attribute and a range, or of a categorical attribute and a value.

The method next generates candidate itemsets from the seed set in block 20. An itemset is a set of items. Candidate itemsets are those considered as candidates from which the quantitative association rules may be identified. Further details on generating candidate itemsets are described below, in accordance with FIGS. 7 and 8.

Proceeding to block 21, the method determines frequent itemsets from the candidate itemsets. Frequent itemsets are those candidate itemsets whose support is more than the user-specified minimum support. At block 22, if new frequent itemsets are found, then these frequent itemsets are used as the seed set for generating the next group of candidate itemsets, as shown by blocks 23 and 20. Once all the frequent itemsets are found, at block 24, the method determines whether a quantitative association rule exists by comparing the support for a selected frequent itemset to that of a subset of the selected frequent itemset. An association rule is output if the ratio of the two support values satisfies a minimum confidence constraint.

Figure 6:
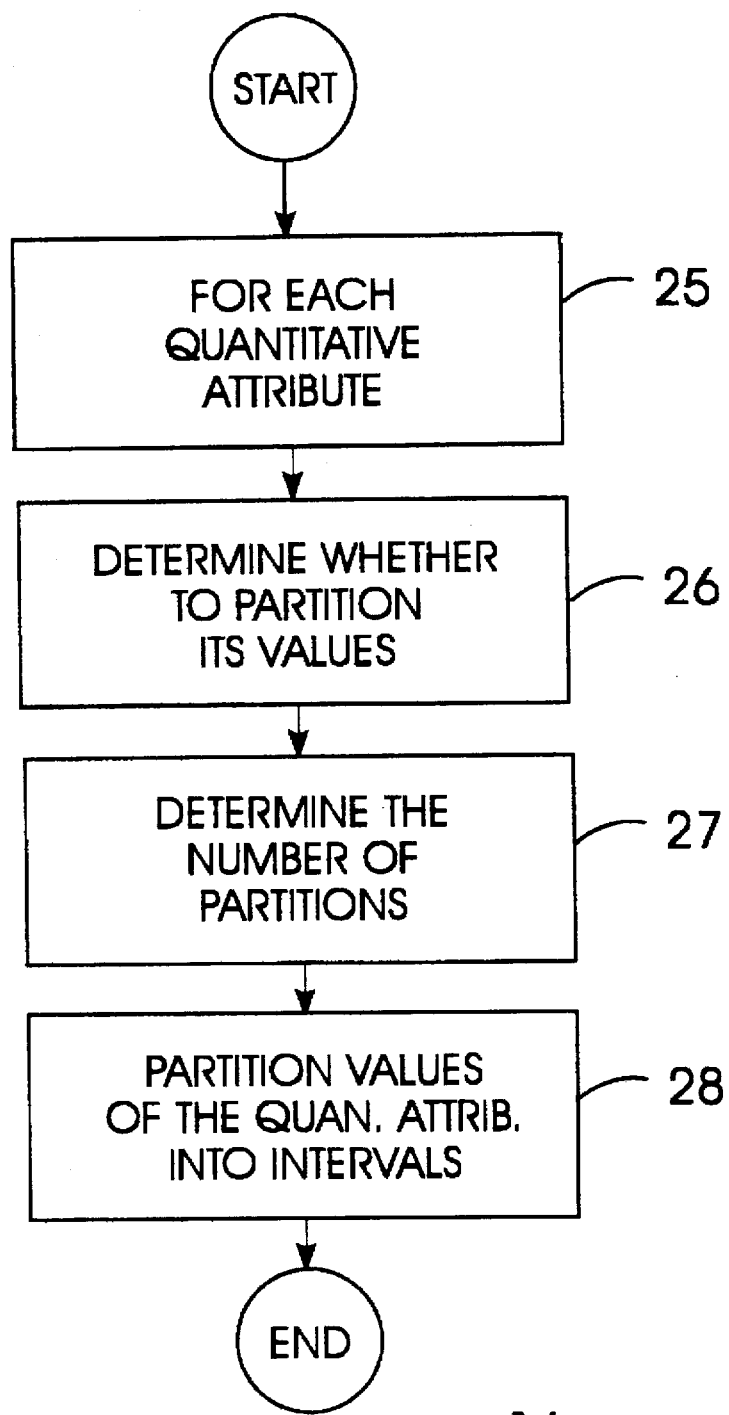
FIG. 6 is a flow chart showing the operation of a preferred embodiment for block 16 of FIG. 5, for partitioning the values of selected quantitative attributes into intervals.

FIG. 6 shows a preferred embodiment for block 16 of FIG. 5, for partitioning the values of selected quantitative attributes into intervals. Beginning at block 25, for each quantitative attribute present in the records, the method determines whether to partition the values of the attribute, according to block 26. The determination is based on a measure of partial completeness, as described below, which indicates the amount of lost information due to the partitioning. At block 27, the number of partitions for the values of the quantitative attribute under test is determined, also based on the measure of partial completeness. The values of the attribute are then partitioned in block 28.

Partial Completeness

The concept of partial completeness (block 26) is summarized as follows. Let C denote the set of all frequent itemsets in a database D. For any real number $K \geq 1$, the set P is K-complete with respect to C if the following conditions are met:

---

1) $P \subseteq C$,
2) $X \in P$ and $X' \subseteq X \rightarrow X' \in P$, and
3) $\forall X \in C$ [ $\exists \hat{X} \in P$ such that
 a) $\hat{X}$ is a generalization of X and
 support($\hat{X}$) $\leq$ K × support(X), and
 b) $\forall Y \subseteq X \exists \hat{Y} \subseteq X$ such that $\hat{Y}$ is a generalization of Y
and support($\hat{Y}$) $\leq$ K × support(Y) ].

---

Conditions (1) and (2) ensure that set P only contains frequent itemsets and that we can generate rules from P. Part (a) of the third condition states that for any itemset in C, there is a generalization of that itemset with at most K times the support in P. Part (b) of the third condition states that the property that the generalization has at most K times the support also holds for corresponding subsets of attributes in the itemset and its generalization. Notice that if K=1, P becomes identical to C.

As an example, assume that the following set C of frequent itemsets is generated from a table of records:

| Itemset Number | Itemset | Support |
| --- | --- | --- |
| 1 | { <Age: 20 ... 30>} | 5% |
| 2 | { <Age: 20 ... 40>} | 6% |
| 3 | { <Age: 20 ... 50>} | 8% |
| 4 | { <Cars: 1 ... 2>} | 5% |
| 5 | { <Cars: 1 ... 3>} | 6% |
| 6 | { <Age: 20 ... 30>}, { <Cars: 1 ... 2>} | 4% |
| 7 | { <Age: 20 ... 40>}, { <Cars: 1 ... 3>} | 5% |

The itemsets 2, 3, 5, and 7 form a 1.5-complete set, since for any itemset X, either 2, 3, 5, or 7 is a generalization whose support is at most 1.5 times the support of X. For example, itemset 2 is a generalization of itemset 1, and the support of itemset 2 is 1.2 times the support of itemset 1. Itemsets 3, 5, and 7 do not form a 1.5-complete set because for itemset 1, the only generalization among itemsets 3, 5, and 7 is itemset 3, and the support for itemset 3 is more than 1.5 times the support of itemset 1.

Typically, to avoid missing some rules, the minimum confidence is set to 1/K times the desired confidence level. The number of intervals or partitions is given by the formula:

$$\text{No. of Intervals} = \frac{2 \times \text{No. of Quantitative Attributes}}{\text{Min. Support} \times (\text{Partial Completeness Level} - 1)}$$

The values of an attribute are partitioned when the number of intervals derived by the above formula is less than the number of distinct values for the particular attribute. In addition, for a given partial completeness level, equi-depth partitioning generally minimizes the number of intervals required to satisfy that partial completeness. Equi-depth partitioning means that for any rule on the data, if the partial completeness level is K, there is a rule generated from the partially complete set which is a generalization of the original rule, whose support is at most K times the support of the original rule, and whose confidence is between 1/K and K times the confidence of the original rule.

Figure 7:
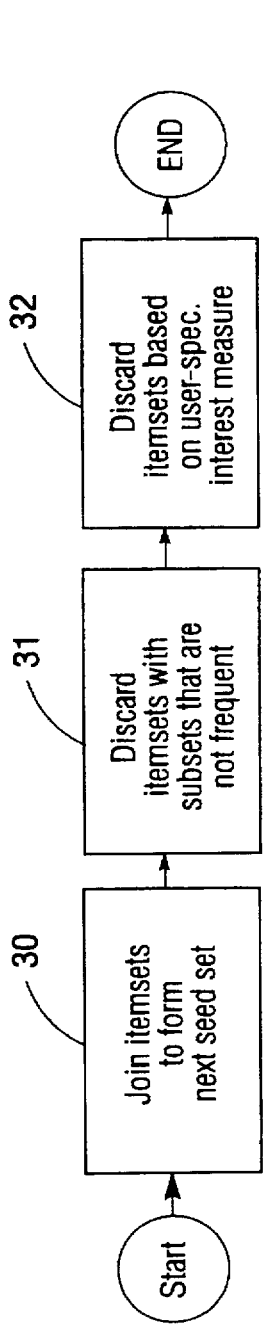
FIG. 7 is a flow chart showing a preferred embodiment of block 20, FIG. 5, for generating of candidate itemsets from the seed set.

Referring now to FIG. 7, the flow chart for a preferred embodiment of block 20 of FIG. 5, for generating candidate itemsets from the seed set, is shown. Starting at block 30, the itemsets of the seed set are joined together to form the next set of candidate itemsets. At block 31, all itemsets having any subset that is not a frequent itemset (as per block 21 ) are discarded since they are already represented by the remaining itemsets. Optionally, to obtain only quantitative association rules that will satisfy a certain user-specified interest level, the method may also discard those itemsets that fail to meet the interest level, at block 32. For instance, an itemset may be deleted if it has an item whose support is greater than 1/R, where R is a measure of the interest level.

Figure 8:
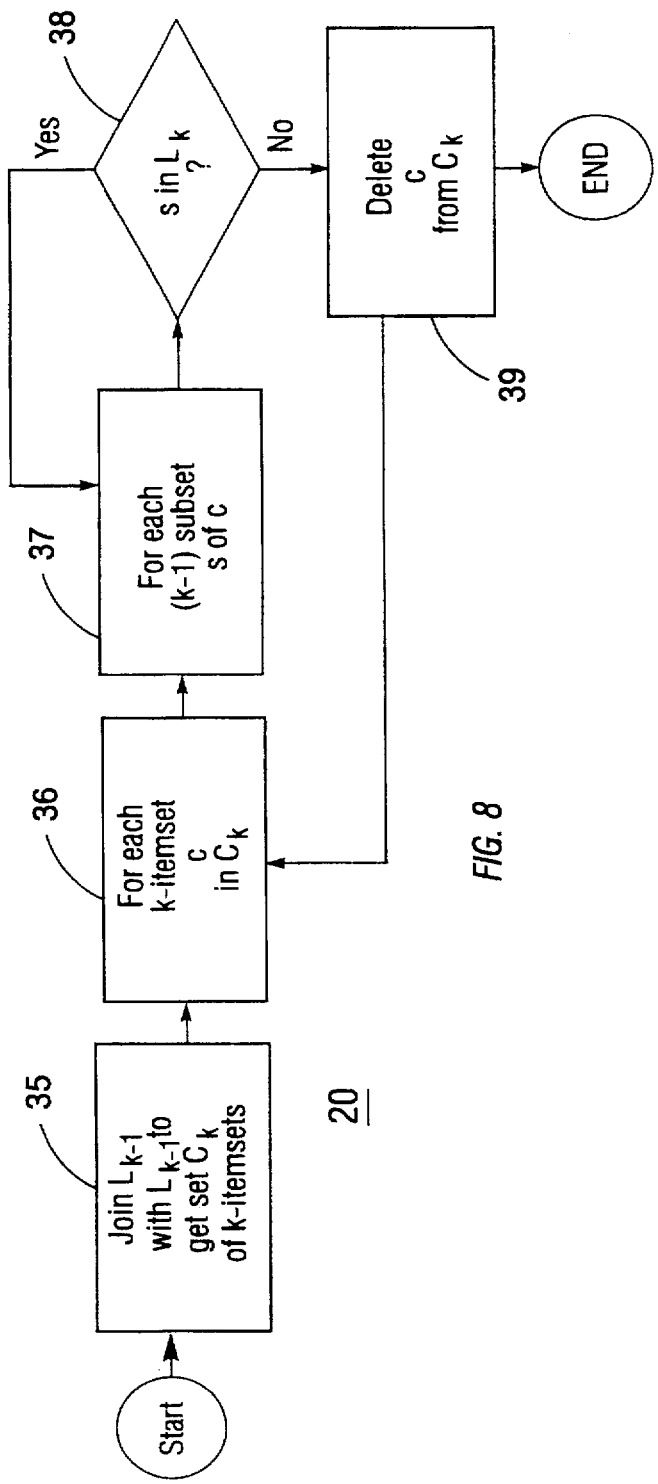
FIG. 8 is a flow chart showing further details of the preferred embodiment for block 20, FIG. 5, for generating of candidate itemsets from the seed set.

FIG. 8 shows an even more detailed flow chart for the preferred embodiment of block 20 of FIG. 5, for generating candidate itemsets. The generation of candidates may be viewed as finding a superset of the set of all frequent k-itemsets, given a set of all frequent (k−1)-itemsets. Beginning with block 35, the itemsets of $L_{k-1}$, where $L_{k-1}$ is the set of all frequent (k−1)-itemsets, are joined with the itemsets of another set $L_{k-1}$ to obtain a set $C_k$ of frequent k-itemsets. Preferably, the joining condition is that the lexicographically ordered first k−2 items are the same, and that the attributes of the last two items are different. For example, let $L_2$ be the set with the following four itemsets:

{<Married: Yes> <Age: 20 ... 24>}

{<Married: Yes> <Age: 20 ... 29>}

{<Married: Yes> <Cars: 0 ... 1>}

{<Age: 20 ... 29> <Cars: 0 ... 1>}

Following the joining operation performed in block 35, set $C_3$, i.e., set $C_k$ where k=3, will have the following two itemsets:

{<Married: Yes> <Age: 20 ... 24> <Cars: 0 ... 1>}

{<Married: Yes> <Age: 20 ... 24> <Cars: 0 ... 1>}

Proceeding to blocks 36 and 37 of FIG. 8, the method examines each k-itemset c in set $C_k$ and for each (k−1)-subset s of c to determine whether s is in the set $C_k$, at block 38. If s is present in $C_k$, then the next (k−1)-subset s of c is considered, as shown by the affirmative branch from block 38. Otherwise, the k-itemset c is deleted from the set $C_k$, according to block 39.

Figure 9:
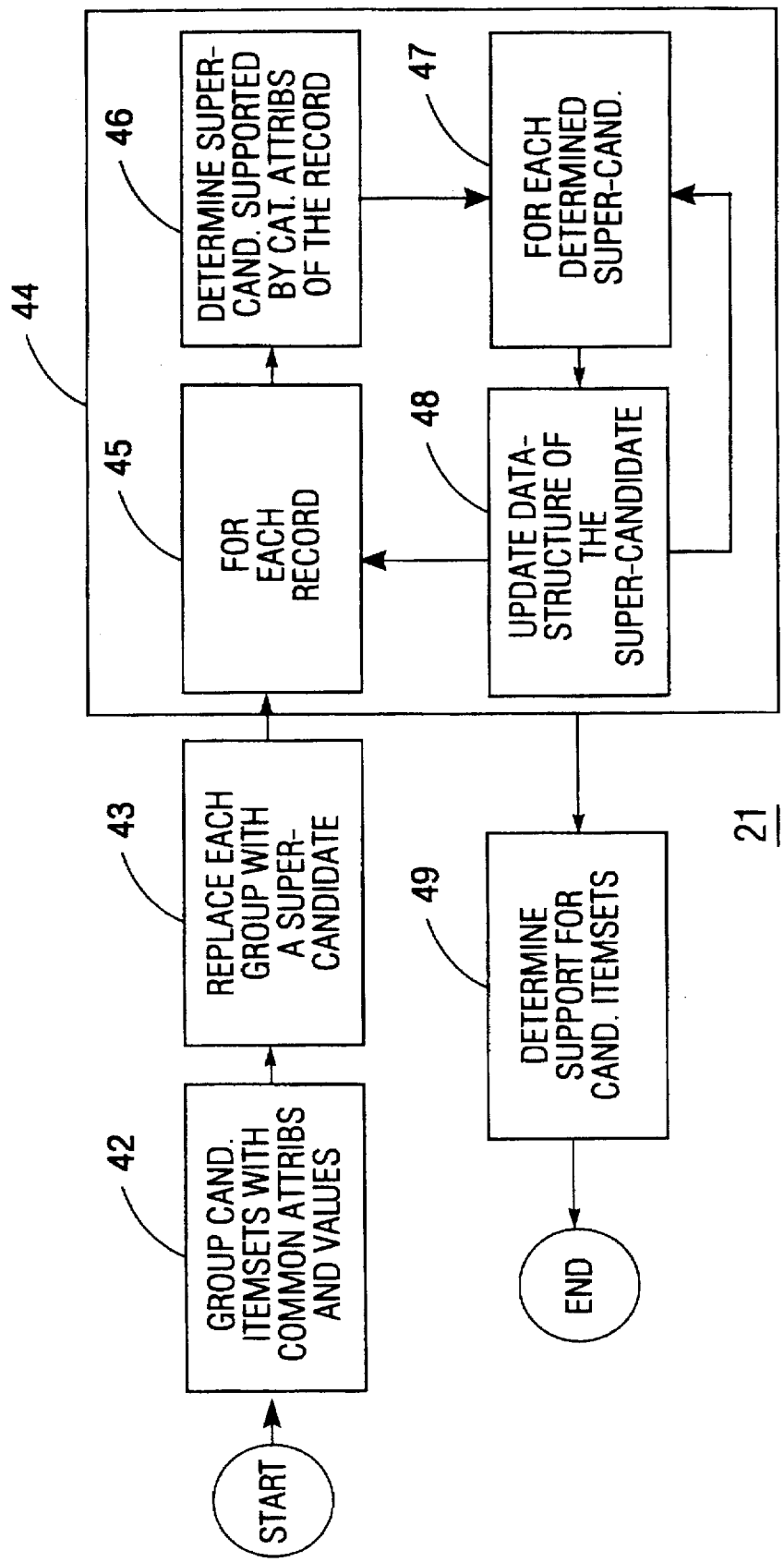
FIG. 9 is a flow chart showing the operation of a preferred embodiment for block 21, FIG. 5, for determining of frequent itemsets from the candidate itemsets.

FIG. 9 shows a method for determining frequent itemsets from the candidate itemsets, per block 21 of FIG. 5. Starting with block 42, the method divides the candidate itemsets into groups, where each group includes the candidate itemsets having the same quantitative attributes, same categorical attributes, and same values for the common categorical attributes. Next, at block 43, each group is replaced with a super-candidate which includes the common categorical attributes and their respective values, and a data structure representing the common quantitative attributes and their values. In block 44, the data structures for the super-candidates supported by the categorical attributes of each record are updated accordingly.

Block 44 may be implemented as FOR loops in a typical programming language, as shown. For each record of the table (block 45), the method determines which super-candidates are supported by the categorical attributes of the record in block 46. Next, at block 47, for each of the determined super-candidates, it updates the data structure of the super-candidate with the values of the quantitative attributes in the record, according to block 48. After executing the steps within block 44 for all the records, the support for each candidate itemset is determined using the super-candidates' data structures, at block 49.

As a further performance improvement, the determination of the frequent itemsets can be facilitated by mapping the values of each categorical attribute into a set of consecutive integer numbers. Similarly, the intervals of each partitioned quantitative attribute (or the values of each non-partitioned quantitative attribute) are mapped into a set of consecutive integers such that the order of the intervals (or values) is preserved.

Figure 10:
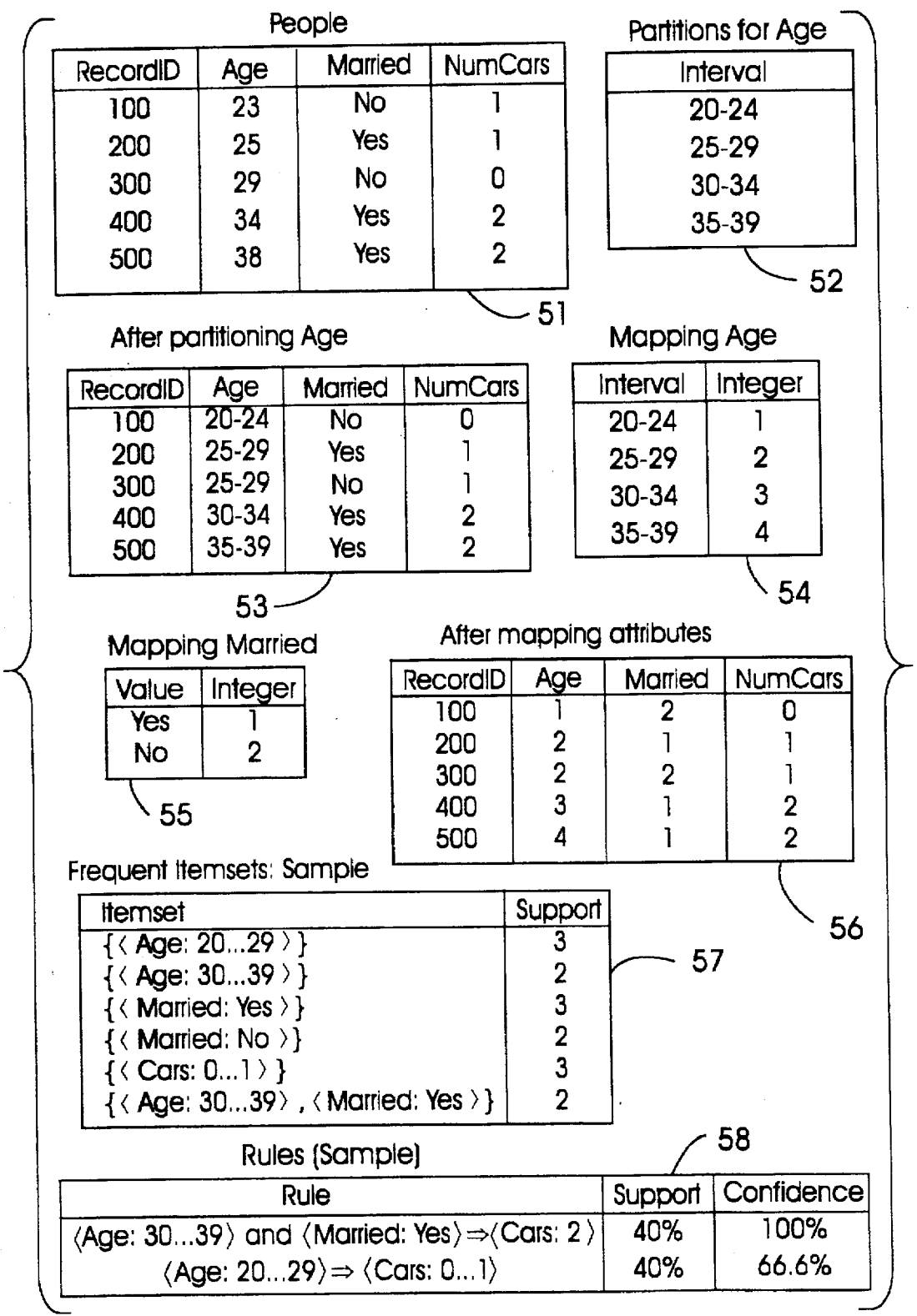
FIG. 10 illustrates the results from performing the method steps on the records of the example shown in FIG. 1.

FIG. 10 illustrates the transformation of the example records of FIG. 1, from their original table format to the final association rules, according to the method of the present invention. Table 51 shows the same table of records depicted in FIG. 1. In accordance with block 16 of FIG. 5, the values of the quantitative attribute "Age" may be partitioned into four intervals, as shown by table 52. Table 53 shows the records with the values of the "Age" attribute replaced by their respective intervals.

Next, tables 54 and 55 show a typical mapping of the intervals for the partitioned quantitative attribute "Age" and the values of the categorical attribute "Married" into sets of consecutive integers. Table 56 depicts the records with their attribute values substituted by the mapped integers. Table 57 shows some typical frequent itemsets as determined according to block 21 of FIG. 5. Finally, table 58 lists two sample quantitative association rules generated from the frequent itemsets, in accordance with block 24 of FIG. 5.

Figure 11:
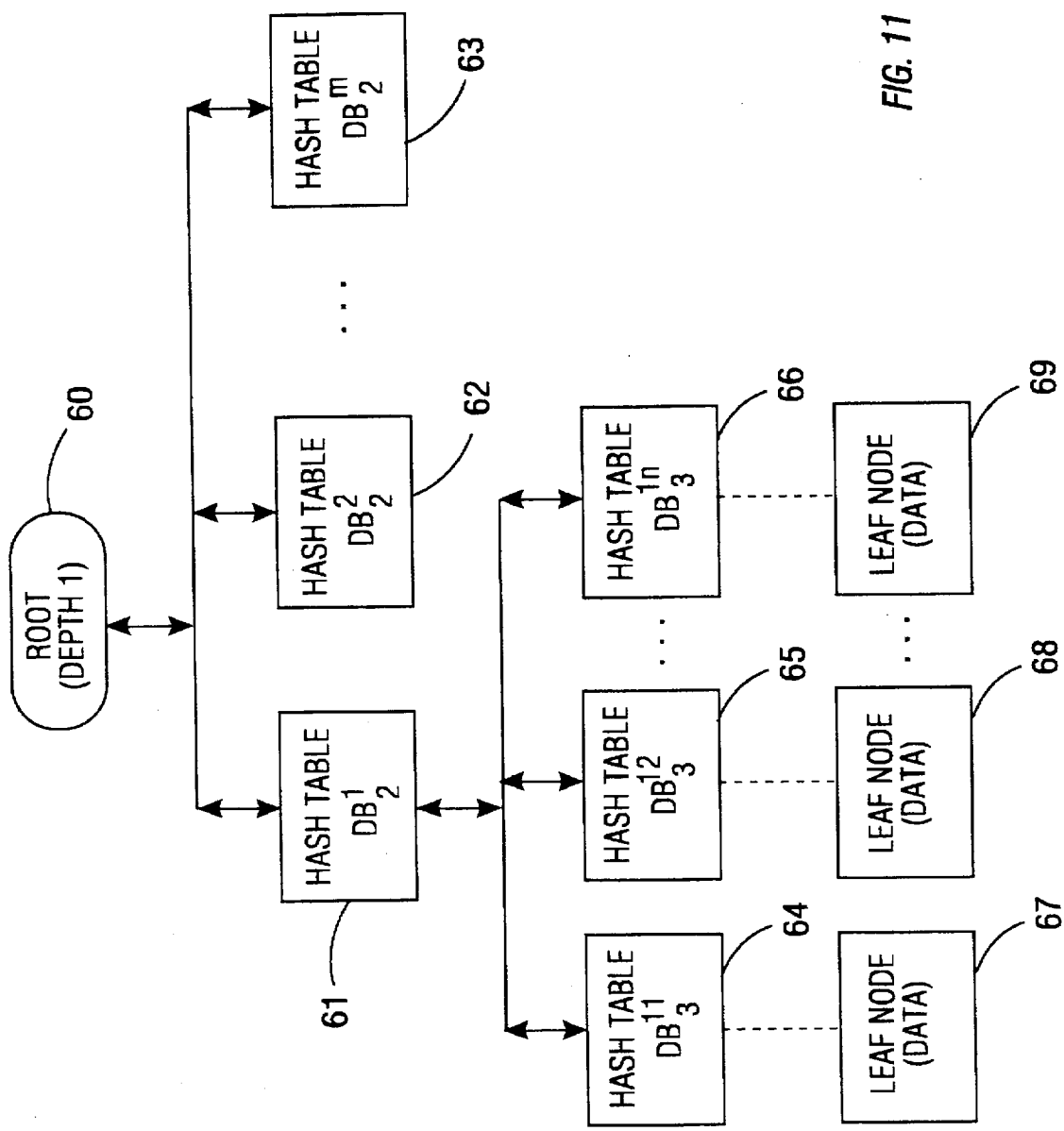
FIG. 11 is a schematic diagram of a typical hash-tree data structure used by the present invention for organizing the super-candidates.

FIG. 11 shows the organization of a typical hash-table data structure that can be used for organizing the super-candidates, which helps improve the performance of the method. The hash-tree includes a root node 60, which is at depth 1. The hash-tree then branches into interior nodes such as nodes 61 through 63, which are at depth 2. Each of the interior nodes 61 through 63 has a hash-table containing one or more buckets, where each bucket corresponds to an interior node at depth 3. The branching continues until the hash-tree terminates with leaf nodes, such as nodes 67 through 69. Each leaf node corresponds to a list of super-candidates. In determining certain super-candidates, starting from the root of the tree, a hash function is applied to the hash-tables until the desired super-candidates are found.

Figure 12:
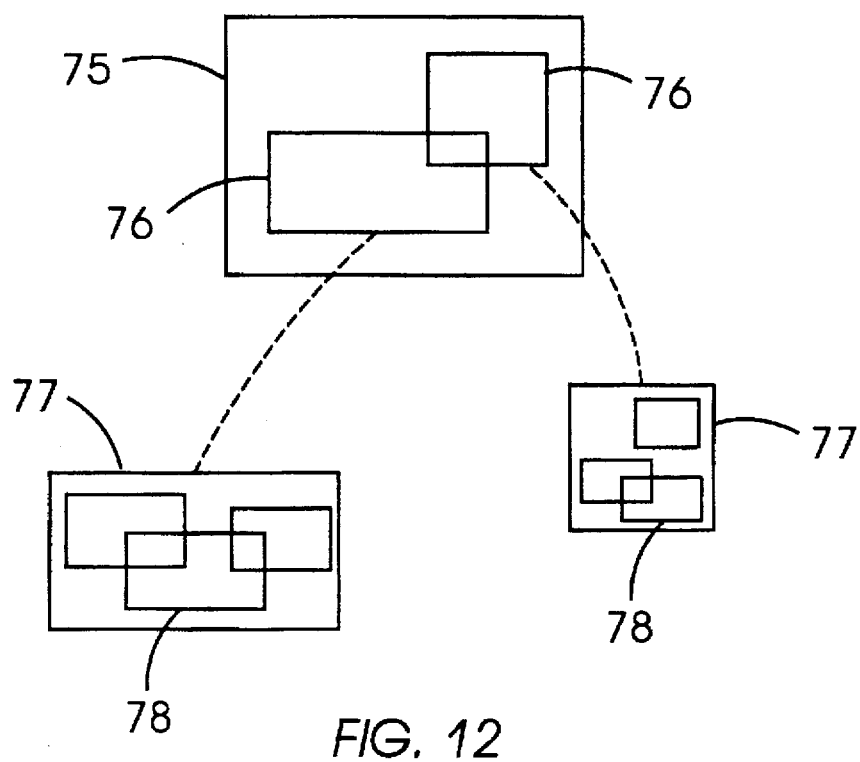
FIG. 12 illustrates the structure of a typical R*-tree data structure included in each super-candidate of block 44, FIG. 9.

In order to improve the performance of the method, the data structure of each super-candidate is preferably a multi-dimensional tree, such as the R*-tree depicted in FIG. 12. Although the R*-tree of FIG. 12 is shown as a two-dimensional tree, it potentially can have any number of dimensions. A multi-dimensional tree includes several nodes, each node having many hyper-rectangles. The boundaries and dimensions of the hyper-rectangles depend on the number of dimensions of the tree. For instance, root node 75 of the depicted tree has two hyper-rectangles 76. Each hyper-rectangle 76 corresponds to a tree node 77 which includes hyper-rectangles 78, at the next level. The tree continues in the same fashion for the next lower levels and also in all of its dimensions.

In accordance with the invention, each hyper-rectangle corresponds to a candidate itemset in the group replaced by the respective super-candidate. The boundaries of the hyper-rectangle in the n-th dimension correspond, respectively, to the ranges of the n-th quantitative attribute of the candidate itemset. Thus, the values of the quantitative attributes in a record would correspond to an n-th dimensional point in the data space defined by the R*-tree. The problem of determining the candidates supported by the record then becomes finding the n-dimensional hyper-rectangles that contain a given n-dimensional point, for a set of n-dimensional points. Furthermore, as part of the updating of the super candidate's data structure, the method increments a support count for each hyper-rectangle that contains the n-th dimensional point corresponding to the quantitative attribute.

Figure 13:
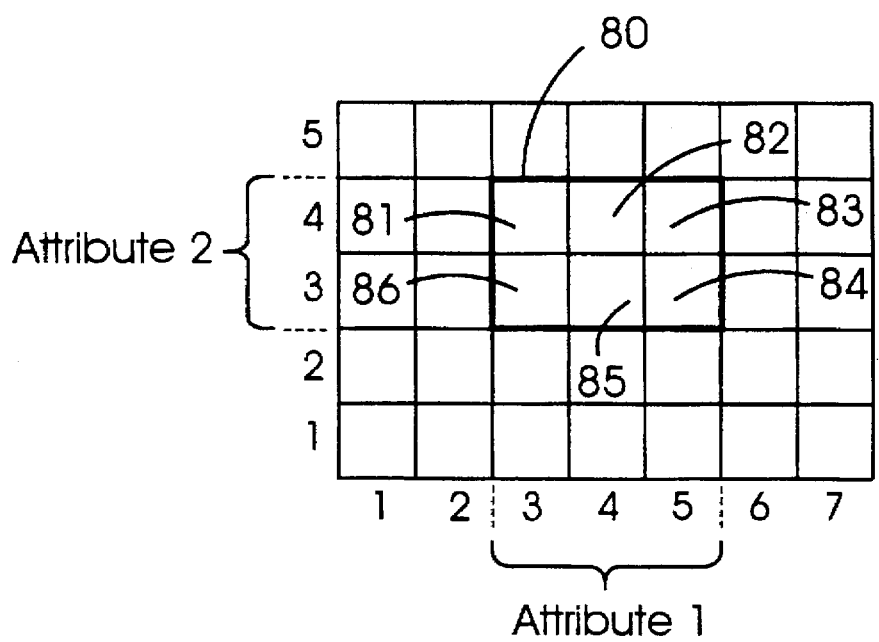
FIG. 13 illustrates the structure of a typical n-dimensional array data structure included in each super-candidate of block 44, FIG. 9.

In another preferred embodiment, the data structures of the super-candidates are n-dimensional arrays of cells, where n is the number of common quantitative attributes in the respective super-candidate, and each dimension corresponds to a common quantitative attribute. The number of cells in a dimension is equal to the number of partitions of the corresponding common attribute, if it is partitioned, or the number of values if the common attribute is not partitioned. As a result, a set of ranges where each range corresponds to a different common quantitative attribute, corresponds to a hyper-rectangle in the n-dimensional array. Each candidate itemset of the super-candidate corresponds to the cells within the hyper-rectangle, and the values of the quantitative attributes in a record correspond to an n-dimensional point. For example, FIG. 13 shows a two-dimension array whose dimensions have 5 and 7 cells, respectively. The hyper-rectangle 80 then corresponds to the ranges 3–5 and 3–4 for the two common quantitative attributes, respectively, of the associated super-candidate.

Furthermore, in accordance with the invention, the step of updating the super-candidate data structure includes incrementing the support count for the cell corresponding to the n-dimensional point. Also, in determining the support for each candidate itemset included in a super-candidate, the method adds together the support counts of all the cells within the hyper-rectangle that corresponds to the ranges of the common quantitative attributes of the candidate itemset. For instance, the support for the candidate itemset having 3–5 and 3–4 as its attribute ranges will be the sum of the support for cells 81 through 86.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for identifying quantitative association rules from a table of records, each record having a plurality of attributes associated therewith, the attributes including quantitative and categorical attributes, each attribute having a value, the method comprising the steps of:

partitioning the values of each quantitative attribute from a selected group of quantitative attributes into a respective plurality of intervals;

determining a support for each value of the categorical attributes and the non-partitioned quantitative attributes, and a support for each interval of the partitioned quantitative attributes, the support for a value being a number of records in the table whose attribute values include the value, the support for an interval being a number of records in the table whose attribute values are part of the interval;

for each quantitative attribute, combining adjacent values of the attribute if the attribute is not partitioned, or adjacent intervals of the attribute if the attribute is partitioned, into ranges, as long as the support for each range is less than a maximum support;

identifying items with at least a minimum support, each item representing a quantitative attribute and a range, or a categorical attribute and a value, the items with at least the minimum support making up a seed set;

generating candidate itemsets from the seed set, each itemset being a set of items and having a support, the support of the itemset being a number of records in the table which support the itemset;

determining frequent itemsets from the candidate itemsets, the frequent itemsets being those itemsets whose support is more than the minimum support, the determined frequent itemsets becoming the next seed set;

repeating the steps of generating candidate itemsets and determining frequent itemsets until all the frequent itemsets are found; and outputting an association rule when the support of a selected frequent itemset bears a predetermined relationship to the support of a subset of the selected frequent itemset, thereby satisfying a minimum confidence constraint, the association rule being an expression of the form $X \rightarrow Y$ where $X$ and $Y$ are itemsets.

2. The method as recited in claim 1, wherein the step of partitioning includes the steps of, for each quantitative attribute:

(a) determining whether to partition the values of the quantitative attribute into the intervals, based on a measure of partial completeness which indicates potential information loss due to the partitioning; and (b) if the values of the quantitative attribute are to be partitioned, then:
  (i) determining a number of partitions into which the values of the quantitative attribute are partitioned, based on the measure of partial completeness; and
  (ii) partitioning the values of the quantitative attribute into the intervals.

3. The method as recited in claim 1, wherein the step of generating candidate itemsets includes the steps of:
  joining the itemsets of the seed set to generate a next set of candidate itemsets; and
  discarding any candidate itemset having a subset that is not a frequent itemset.

4. The method as recited in claim 3 further comprises the step of discarding any candidate itemset whose support is more than 1/R, where R is a user-specified interest measure.

5. The method as recited in claim 1 further comprising the steps of:
  for each categorical attribute, mapping the values of the categorical attribute into a set of consecutive integers;
  for each quantitative attribute whose values are partitioned into intervals, mapping the intervals into a set of consecutive integers such that the order of the intervals are preserved; and
  for each quantitative attribute whose values are not partitioned into intervals, mapping the values of the quantitative attribute into a set of consecutive integers such that the order of the values are preserved.

6. The method as recited in claim 1 further comprising the step of discarding those association rules that do not satisfy a user-specified interest measure.

7. The method as recited in claim 1, wherein the step of determining frequent itemsets includes the steps of:
  (a) dividing the candidate itemsets into groups, each group including the candidate itemsets that have common quantitative and categorical attributes, and common values for the respective common categorical attributes;
  (b) replacing each group with a super-candidate, each super-candidate having (i) the common categorical attributes and their respective values, and (ii) a data structure representing the common quantitative attributes and their values;
  (c) for each record of the table:
    (i) determining which super-candidates are supported by the categorical attributes in the record; and
    (ii) updating the data structure for each determined super-candidate with the values of the quantitative attributes in the record; and
  (d) determining the support for each candidate itemset using the data structures of the super-candidates.

8. The method as recited in claim 7 further comprising the step of:
  entering the super-candidates into a hash-tree data structure; and
  wherein the step of determining which super-candidates is based on the hash-tree data structure.

9. The method as recited in claim 7, wherein:
  the data structure is a multi-dimensional tree having a plurality of hyper-rectangles, each hyper-rectangle corresponding to a candidate itemset and having a plurality of boundaries and a plurality of dimensions, the boundaries of the hyper-rectangle in the n-th dimension corresponding, respectively, to the ranges of the n-th quantitative attribute of the candidate itemset, whereby the values of the quantitative attributes in a record correspond to an n-dimensional point; and
  the step of updating the data structure includes incrementing a support count for each hyper-rectangle that contains the n-dimensional point corresponding to the quantitative attributes of the record.

10. The method as recited in claim 7, wherein:
  the data structure is an n-dimensional array having a plurality of cells, n being the number of the common quantitative attributes in the respective super-candidate, each dimension of the array corresponding to a common quantitative attribute, the number of cells in a j-th dimension of the array being equal to the number of partitions of the common quantitative attribute if the common quantitative attribute is partitioned, or the number of values of the common quantitative attribute if the common quantitative attribute is not partitioned, each candidate itemset of the super-candidate corresponding to the cells within a hyper-rectangle, the boundaries of the hyper-rectangle corresponding respectively to the ranges of the n-th quantitative attribute of the candidate itemset, and the values of the quantitative attributes in a record corresponding to an n-dimensional point;
  the step of updating the data structure includes incrementing a support count for a cell corresponding to the n-dimensional point; and
  the step of determining a support for each candidate itemset includes adding, for each candidate itemset replaced by the super-candidate, the support counts of all the cells within the hyper-rectangle corresponding to the quantitative attributes of the candidate itemset, in order to obtain the support for the candidate itemset.

11. A computer program product for use with a computer system for identifying quantitative association rules from a table of records, each record having a plurality of attributes associated therewith, the attributes including quantitative and categorical attributes, each attribute having a value, the computer program product comprising:
  a recording medium;
  means, recorded on the recording medium, for directing the computer system to partition the values of each quantitative attribute from a selected group of quantitative attributes into a respective plurality of intervals;
  means, recorded on the recording medium, for directing the computer system to determine a support for each value of the categorical attributes and the non-partitioned quantitative attributes, and a support for each interval of the partitioned quantitative attributes, the support for a value being a number of records in the table whose attribute values include the value, the support for an interval being a number of records in the table whose attribute values are part of the interval;
  means, recorded on the recording medium, for directing the computer system, for each quantitative attribute, to combine adjacent values of the attribute if the attribute is not partitioned, or adjacent intervals of the attribute if the attribute is partitioned, into ranges, as long as the support for each range is less than a maximum support;
  means, recorded on the recording medium, for directing the computer system to identify items with at least a minimum support, each item representing a quantitative attribute and a range, or a categorical attribute and a value, the items with at least the minimum support making up a seed set;
  means, recorded on the recording medium, for directing the computer system to generate candidate itemsets from the seed set, each itemset being a set of items and having a support, the support of the itemset being a number of records in the table which support the itemset;

means, recorded on the recording medium, for directing the computer system to determine frequent itemsets from the candidate itemsets, the frequent itemsets being those itemsets whose support is more than the minimum support, the determined frequent itemsets becoming the next seed set;

means, recorded on the recording medium, for directing the computer system to repeat the steps of generating candidate itemsets and determining frequent itemsets until all the frequent itemsets are found; and means, recorded on the recording medium, for directing the computer system to output an association rule when the support of a selected frequent itemset bears a predetermined relationship to the support of a subset of the selected frequent itemset, thereby satisfying a minimum confidence constraint, the association rule being an expression of the form $X \rightarrow Y$ where X and Y are itemsets.

12. The computer program product as recited in claim 11, wherein the means for directing to partition includes, for each quantitative attribute:

(a) means, recorded on the recording medium, for directing the computer system to determine whether to partition the values of the quantitative attribute into the intervals, based on a measure of partial completeness which indicates potential information loss due to the partitioning; and (b) if the values of the quantitative attribute are to be partitioned, then:

(i) means, recorded on the recording medium, for directing the computer system to determine a number of partitions into which the values of the quantitative attribute are partitioned, based on the measure of partial completeness; and (ii) means, recorded on the recording medium, for directing the computer system to partition the values of the quantitative attribute into the intervals.

13. The computer program product as recited in claim 11, wherein the means for directing to generate candidate itemsets includes:

means, recorded on the recording medium for directing the computer system to join the itemsets of the seed set to generate a next set of candidate itemsets; and means, recorded on the recording medium for directing the computer system to discard any candidate itemset having a subset that is not a frequent itemset.

14. The computer program product as recited in claim 13 further comprises means, recorded on the recording medium for directing the computer system to discard any candidate itemset whose support is more than 1/R, where R is a user-specified interest measure.

15. The computer program product as recited in claim 11 further comprising:

means, recorded on the recording medium for directing the computer system to map, for each categorical attribute, the values of the categorical attribute into a set of consecutive integers;

means, recorded on the recording medium for directing the computer system to map, for each quantitative attribute whose values are partitioned into intervals, the intervals into a set of consecutive integers such that the order of the intervals are preserved; and means, recorded on the recording medium for directing the computer system to map, for each quantitative attribute whose values are not partitioned into intervals, the values of the quantitative attribute into a set of consecutive integers such that the order of the values are preserved.

16. The computer program product as recited in claim 11 further comprising means, recorded on the recording medium for directing the computer system to discard those association rules that do not satisfy a user-specified interest measure.

17. The computer program product as recited in claim 11, wherein the means for directing to determine frequent itemsets includes:

(a) means, recorded on the recording medium for directing the computer system to divide the candidate itemsets into groups, each group including the candidate itemsets that have common quantitative and categorical attributes, and common values for the respective common categorical attributes;

(b) means, recorded on the recording medium for directing the computer system to replace each group with a super-candidate, each super-candidate having (i) the common categorical attributes and their respective values, and (ii) a data structure representing the common quantitative attributes and their values;

(c) means, recorded on the recording medium for directing the computer system, for each record of the table, to:

(i) determine which super-candidates are supported by the categorical attributes in the record; and (ii) update the data structure for each determined super-candidate with the values of the quantitative attributes in the record; and (d) means, recorded on the recording medium for directing the computer system to determine the support for each candidate itemset using the data structures of the super-candidates.

18. The computer program product as recited in claim 17 further comprising:

means, recorded on the recording medium for directing the computer system to enter the super-candidates into a hash-tree data structure; and wherein the means for directing to determine which super-candidates is based on the hash-tree data structure.

19. The computer program product as recited in claim 17, wherein:

the data structure is multi-dimensional tree having a plurality of hyper-rectangles, each hyper-rectangle corresponding to a candidate itemset of the super-candidate and having a plurality of boundaries and dimensions, the boundaries of the hyper-rectangle in the n-th dimension corresponding, respectively, to the ranges of the n-th quantitative attribute of the candidate itemset, whereby the values of the quantitative attributes in a record correspond to an n-dimensional point; and the means for directing to update the data structure includes means, recorded on the recording medium for directing the computer system to increment a support count for each hyper-rectangle that contains the n-dimensional point corresponding to the quantitative attributes of the record.

20. The computer program product as recited in claim 17, wherein:

the data structure is an n-dimensional array having a plurality of cells and a plurality of hyper-rectangles, n being the number of the common quantitative attributes in the respective super-candidate, each dimension of the array corresponding to a common quantitative attribute, the number of cells in a j-th dimension of the array being equal to the number of partitions of the common quantitative attribute if the common quantitative attribute is partitioned, or the number of values of the common quantitative attribute if the common quantitative attribute is not partitioned, each hyper-rectangle corresponding to a candidate itemset, and the values of the quantitative attributes in a record corresponding to an n-dimensional point;

the means for directing to update the data structure includes means, recorded on the recording medium for directing the computer system to increment a support count for a cell corresponding to the n-dimensional point; and the means for directing to determine a support for each candidate itemset includes means, recorded on the recording medium for directing the computer system to add, for each candidate itemset replaced by the super-candidate, the support counts of all the cells within the hyper-rectangle corresponding to the quantitative attribute of the candidate itemset, in order to obtain the support for the candidate itemset.

21. A computer-based system for identifying quantitative association rules from a table of records, each record having a plurality of attributes associated therewith, the attributes including quantitative and categorical attributes, each attribute having a value, the system comprising:

means for partitioning the values of each quantitative attribute from a selected group of quantitative attributes into a respective plurality of intervals;

means for determining a support for each value of the categorical attributes and the non-partitioned quantitative attributes, and a support for each interval of the partitioned quantitative attributes, the support for a value being a number of records in the table whose attribute values include the value, the support for an interval being a number of records in the table whose attribute values are part of the interval;

means for combining, for each quantitative attribute, adjacent values of the attribute if the attribute is not partitioned, or adjacent intervals of the attribute if the attribute is partitioned, into ranges, as long as the support for each range is less than a maximum support;

means for identifying items with at least a minimum support, each item representing a quantitative attribute and a range, or a categorical attribute and a value, the items with at least the minimum support making up a seed set;

means for generating candidate itemsets from the seed set, each itemset being a set of items and having a support, the support of the itemset being a number of records in the table which support the itemset;

means for determining frequent itemsets from the candidate itemsets, the frequent itemsets being those itemsets whose support is more than the minimum support, the determined frequent itemsets becoming the next seed set;

means for repeating the operation of the means for generating candidate itemsets and means for determining frequent itemsets until a. II the frequent itemsets are found; and means for outputting an association rule when the support of a selected frequent itemset bears a predetermined relationship to the support of a subset of the selected frequent itemset, thereby satisfying a minimum confidence constraint, the association rule being an expression of the form $X \rightarrow Y$ where X and Y are itemsets.

22. The system as recited in claim 21, wherein the means for partitioning includes, for each quantitative attribute:

(a) means for determining whether to partition the values of the quantitative attribute into the intervals, based on a measure of partial completeness which indicates potential information loss due to the partitioning; and (b) if the values of the quantitative attribute are to be partitioned, then:

(i) means for determining a number of partitions into which the values of the quantitative attribute are partitioned, based on the measure of partial completeness; and (ii) means for partitioning the values of the quantitative attribute into the intervals.

23. The system as recited in claim 21, wherein the means for generating candidate itemsets includes:

means for joining the itemsets of the seed set to generate a next set of candidate itemsets; and means for discarding any candidate itemset having a subset that is not a frequent itemset.

24. The system as recited in claim 23 further comprising means for discarding any candidate itemset whose support is more than 1/R, where R is a user-specified interest measure.

25. The system as recited in claim 21 further comprising:

means for mapping, for each categorical attribute, the values of the categorical attribute into a set of consecutive integers;

means for mapping, for each quantitative attribute whose values are partitioned into intervals, the intervals into a set of consecutive integers such that the order of the intervals are preserved; and means for mapping, for each quantitative attribute whose values are not partitioned into intervals, the values of the quantitative attribute into a set of consecutive integers such that the order of the values are preserved.

26. The system as recited in claim 21 further comprising means for discarding those association rules that do not satisfy a user-specified interest measure.

27. The system as recited in claim 21, wherein the means for determining frequent itemsets includes:

(a) means for dividing the candidate itemsets into groups, each group including the candidate itemsets that have common quantitative and categorical attributes, and common values for the respective common categorical attributes;

(b) means for replacing each group with a super-candidate, each super-candidate having (i) the common categorical attributes and their respective values, and (ii) a data structure representing the common quantitative attributes and their values;

(c) for each record of the table:

(i) means for determining which super-candidates are supported by the categorical attributes in the record; and (ii) means for updating the data structure for each determined super-candidate with the values of the quantitative attributes in the record; and (d) means for determining the support for each candidate itemset using the data structures of the super-candidates.

28. The system as recited in claim 27 further comprising:
means for entering the super-candidates into a hash-tree data structure; and
wherein the means for determining which super-candidates is based on the hash-tree data structure.

29. The system as recited in claim 27, wherein:
the data structure is a multi-dimensional tree having a plurality of hyper-rectangles, each hyper-rectangle corresponding to a candidate itemset and having a plurality of boundaries and a plurality of dimensions, the boundaries of the hyper-rectangle in the n-th dimension corresponding, respectively, to the ranges of the n-th quantitative attribute of the candidate itemset, whereby the values of the quantitative attributes in a record correspond to an n-dimensional point; and
the means for updating the data structure includes means for incrementing a support count for each hyper-rectangle that contains the n-dimensional point corresponding to the quantitative attributes of the record.

30. The system as recited in claim 27, wherein:
the data structure is an n-dimensional array having a plurality of cells and a plurality of hyper-rectangles, n being the number of the common quantitative attributes in the respective super-candidate, each dimension of the array corresponding to a common quantitative attribute, the number of cells in a j-th dimension of the array being equal to the number of partitions of the common quantitative attribute if the common quantitative attribute is partitioned, or the number of values of the common quantitative attribute if the common quantitative attribute is not partitioned, each hyper-rectangle corresponding to a candidate itemset, and the values of the quantitative attributes in a record corresponding to an n-dimensional point;

the means for updating the data structure includes means for incrementing a support count for a cell corresponding to the n-dimensional point; and the means for determining a support for each candidate itemset includes means for adding, for each candidate itemset replaced by the super-candidate, the support counts of all the cells within the hyper-rectangle corresponding to the quantitative attribute of the candidate itemset, in order to obtain the support for the candidate itemset.

* * * * *